US010073873B2

(12) United States Patent
Ku et al.

(10) Patent No.: US 10,073,873 B2
(45) Date of Patent: Sep. 11, 2018

(54) SYSTEM AND METHOD FOR COLUMN-SPECIFIC MATERIALIZATION SCHEDULING

(71) Applicant: Futurewei Technologies, Inc., Plano, TX (US)

(72) Inventors: Chi Young Ku, San Ramon, CA (US); Ron-Chung Hu, Palo Alto, CA (US); Mengmeng Chen, San Jose, CA (US)

(73) Assignee: Futurewei Technologies, Inc., Plano, TX (US)

(*) Notice: Subject to any disclaimer, the term of this patent is extended or adjusted under 35 U.S.C. 154(b) by 580 days.

(21) Appl. No.: 14/663,210

(22) Filed: Mar. 19, 2015

(65) Prior Publication Data

US 2015/0269202 A1 Sep. 24, 2015

Related U.S. Application Data

(60) Provisional application No. 61/968,793, filed on Mar. 21, 2014.

(51) Int. Cl.
*G06F 17/30* (2006.01)

(52) U.S. Cl.
CPC .. *G06F 17/30315* (2013.01); *G06F 17/30463* (2013.01); *G06F 17/30598* (2013.01); *G06F 17/30864* (2013.01); *G06F 17/30935* (2013.01)

(58) Field of Classification Search
USPC ........................................ 707/715, 752, 756
See application file for complete search history.

(56) References Cited

U.S. PATENT DOCUMENTS

| 2009/0150413 | A1 | 6/2009 | Basu et al. | |
|---|---|---|---|---|
| 2012/0117027 | A1* | 5/2012 | Shau et al. | 707/638 |
| 2014/0075350 | A1 | 3/2014 | Gauthier et al. | |
| 2015/0220571 | A1* | 8/2015 | Ku et al. | 707/752 |
| 2015/0234935 | A1* | 8/2015 | Gu et al. | 707/756 |

FOREIGN PATENT DOCUMENTS

EP    2 040 180 A1    3/2009

OTHER PUBLICATIONS

Mary Jane Willshire., How Spacey Can They Get? Space Overhead for Storage and Indexing with Object-Oriented Databases, 1991, IEEE, 14-22. (Year: 1991).*
"European Application No. 15764647.2, Extended European Search Report dated Jan. 24, 2017", (dated Jan. 24, 2017), 9 pgs.

(Continued)

*Primary Examiner* — Jean B Fleurantin
(74) *Attorney, Agent, or Firm* — Schwegman Lundberg & Woessner, P.A.

(57) ABSTRACT

A method of dynamically computing an optimal materialization schedule for each column in a column oriented RDBMS. Dynamic column-specific materialization scheduling in a distributed column oriented RDBMS is optimized by choosing a materialization strategy based on execution cost including central processing unit (CPU), disk, and network costs for each individual exchange operator. The dynamic programming approach is computationally feasible because the optimal schedule for a sub-plan is path independent.

18 Claims, 7 Drawing Sheets

(56) References Cited

OTHER PUBLICATIONS

Abadi, Daniel J., et al., "Materialization Strategies in a Column-Oriented DBMS", IEEE 23rd International Conference on Data Engineering, 2007, ICDE 2007, Apr. 1, 2007, pp. 466-475, (Apr. 1, 2007), 466-475.
Dai, Xiaolei, et al., "The Application of Materialization Strategies on OLAP in Column Oriented Database Systems", 2011 IEEE 3rd International Conference on Communication Software and Networks (ICCSN), May 27, 2011, pp. 305-308, (May 27, 2011), 305-308.
Shrinivas, Lakshmikant, et al., "Materialization Strategies in the Vertica Analytic Database: Lessons Learned", 2013 IEEE 29th International Conference on Data Engineering (ICDE), Apr. 8, 2013, pp. 1196-1207, (Apr. 8, 2013), 1196-1207.
Zhang, Bin, et al., "Query Optimization with Value Path Materialization in Column-Stored DWMS", Computing for Geospatial Research and Applications, ACM, New York, New York, Jul. 1, 2012, pp. 1-6, (Jul. 1, 2012), 1-6.

* cited by examiner

```
Procedure MaterializationSchedule( Exchange Node E, level L, column C)
// Array K contains materialization costs for various levels.
if (L == 1) then {
    if (early schedule cost < late schedule cost)
        then return early schedule M[1] with cost K[1];
        else return late schedule M[1] with cost K[1];
} set cost K[L-1] by calling MaterializationSchedule(E's child, L-1, C);

Set schedule M[L] to the lower cost strategy:
    minimize { K[L-1] + early materialization cost,
               K[L-1] + late materialization cost};

K[L] = K[L-1] + materialization cost at level L;
End Procedure
```

FIG. 3

SYSTEM AND METHOD FOR COLUMN-SPECIFIC MATERIALIZATION SCHEDULING

CLAIM OF PRIORITY

This application claims priority under 35 U.S.C. 119(e) of commonly assigned U.S. Provisional Patent application 61/968,793 entitled "COLUMN-SPECIFIC MATERIALIZATION SCHEDULING" filed Mar. 21, 2014, the teachings of which are included herein in their entirely.

TECHNICAL FIELD

The present disclosure is generally directed to relational database management systems (RDBMSs), and more specifically to a system and method for column-specific materialization in a column oriented RDBMS.

BACKGROUND

A column oriented RDBMS is a DBMS that stores data tables as sections of columns of data, rather than as rows of data. During query execution in a column oriented RDBMS, it is often necessary to stitch together multiple columns of a record. Some of the columns are added to intermediate results during the query execution. This process is called materialization. How columns are materialized is an important factor in determining query performance in a column oriented RDBMS. Existing column oriented RDBMSs typically employ either fixed early materialization or fixed late materialization. In early materialization, columns referenced in a query are fetched at the leaf nodes of an operator graph and they are transmitted from a child operator to a parent operator if required by up-stream operators. In late materialization, columns needed by an operator are fetched from their sources just before processing and discarded afterwards. For most column oriented RDBMSs, the column materialization strategy is hard coded.

SUMMARY

This disclosure is directed to determining an optimal materialization schedule for each column in a query execution in a column oriented RDBMS.

One example embodiment includes a method of dynamically establishing a materialization schedule in a RDBMS. The method includes receiving a query text, transforming the query text into a Rel directed acyclic graph (DAG), performing a bottom-up transversal of the Rel DAG to create a parallel Rel DAG, and computing a column specific materialization schedule of the parallel Rel DAG. The parallel Rel DAG is transformed into a DAG of function calls and data re-shuffling actions to create a parallel statement forest. A coordinator statement forest is generated that invokes the function calls and the data re-shuffling actions according to the parallel statement forest. The parallel statement forest and the coordinator statement forest are transformed into a forest of binary association table (BAT) operator lists to compute an optimal materialization schedule for each column of a table.

In another example embodiment, a RDBMS is configured to dynamically establish a materialization schedule.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 3 illustrates an example column-specific materialization algorithm in accordance with this disclosure;

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

In a given query in a column oriented RDBMS, different columns are accessed by different sets of operators. Therefore, using a single materialization approach for all columns in the query would likely result in some columns not being materialized in an optimal fashion. Embodiments of this disclosure provide a method and apparatus for dynamic column-specific materialization scheduling in a distributed column oriented RDBMS. The materialization schedule is optimized by selecting a materialization strategy based on an execution cost including central processing unit (CPU), disk, and network costs for each individual exchange operator. The disclosed embodiments use dynamic programming techniques to determine the optimal materialization schedule. Dynamic programming is computationally feasible for the disclosed embodiments because the optimal schedule for a sub-plan is path independent.

As described earlier, conventional materialization schemes include early materialization and late materialization. To better illustrate these materialization schemes, examples of each will now be described.

Figure 1:
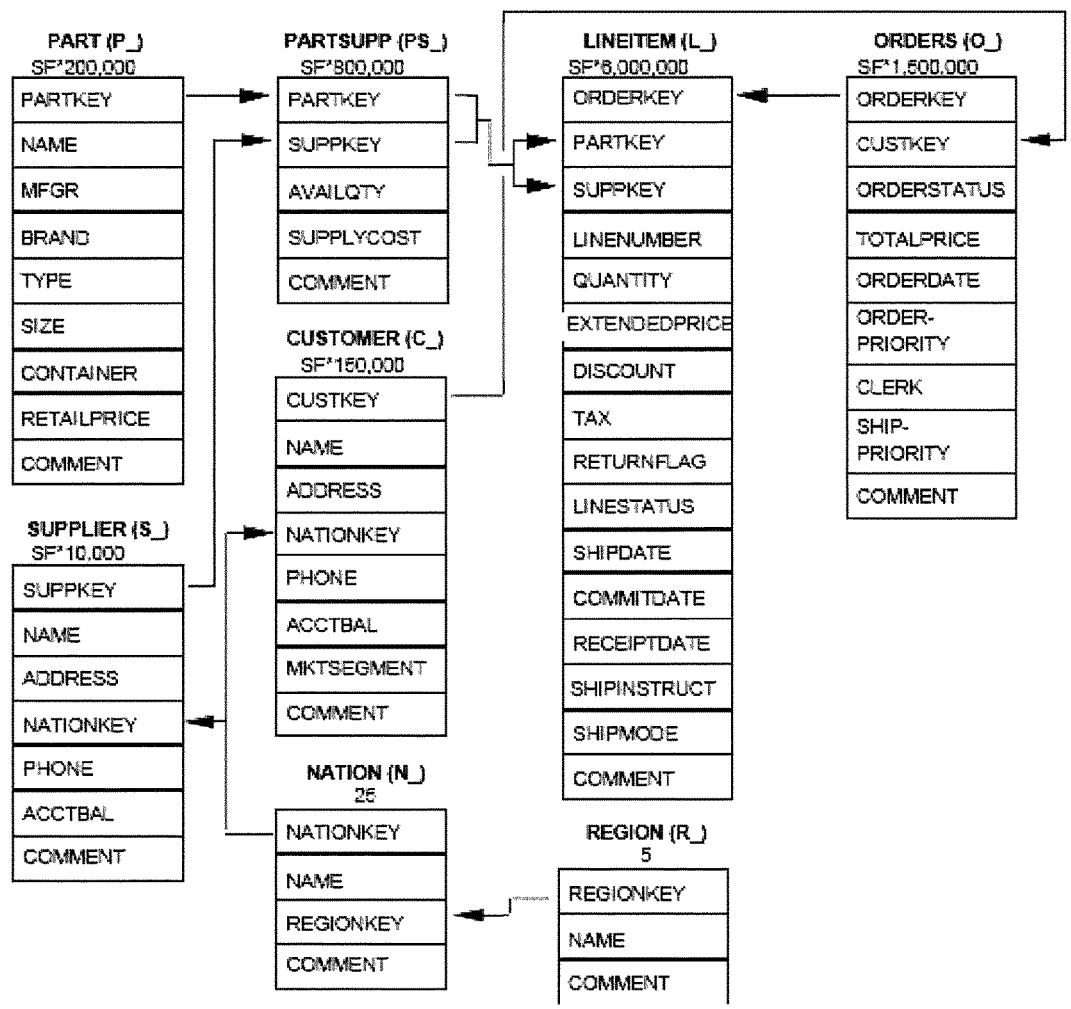
FIG. 1 illustrates a table schema from the Transaction Processing Performance Council (TPC) Benchmark H (TPC-H)

To illustrate an example of early materialization, consider the following example Query 1, which is based on existing tables in the Transaction Processing Performance Council (TPC) Benchmark H (TPC-H) table schema shown in FIG. 1.

Example Query 1

SELECT 1_suppkey from lineitem, part
WHERE 1_partkey=p_partkey
AND 1_shipdate>'2008-01-01';

For the purposes of this example, it is assumed that the table PART is partitioned by the column p_partkey, and that the table LINEITEM is partitioned by the column 1_orderkey. Based on the known data in the PART and LINEITEM tables, it can be shown that, for Query 1, the join selectivity is approximately 50%. As known in the art, join selectivity is a measure of how much variation (i.e., how many different values) exists between records in a join result. Low selectivity means that there is not a lot of variation in the values in a column, while high selectivity means there is substantial variation in the values in the column. Before a shuffle of the records in the table LINEITEM, the join selectivity can be examined to determine the cost of early materialization and late materialization. After computing the cost, it is found that early materialization (i.e., stitch 1_suppkey with 1_partkey, and then shuffle) is better for Query 1. This is because the communication/CPU cost of sending 50% of Row IDs and 1_suppkey column data would be more costly than re-shuffling the entire 1_suppkey column data.

To illustrate an example of late materialization, consider the following example Query 2, which is also based on the TPC-H table schema shown in FIG. 1.

Example Query 2

SELECT 1_suppkey from lineitem, part
WHERE 1_partkey=p_partkey
AND 1_shipdate>'2014-10-01';

Once again, it is assumed that the table PART is partitioned by the column p_partkey, and that the table LINEITEM is partitioned by the column 1_orderkey. Because of the different shipdate value in Query 2, it can be shown that the join selectivity for Query 2 is approximately 1%. The cost to shuffle the records in the table LINEITEM using early materialization and late materialization can be determined. After computing the cost, it is found that late materialization (i.e., join first, and then fetch the useful 1_suppkey data) is better for Query 2. This is because the communication/CPU cost of sending 1% of Row IDs and 1_suppkey column data separately would be less costly than re-shuffling the entire 1_suppkey column with 1_partkey data.

For some queries that have multiple table joins, a mixed materialization scheme in accordance with this disclosure can be used. For example, consider the example Query 3, which is also based on the TPC-H table schema shown in FIG. 1.

Example Query 3

SELECT 1_suppkey from lineitem, part a, part b
WHERE 1_partkey=a.p_partkey
AND 1_suppkey=b.p_partkey
AND 1_shipdate>'2008-10-01';

Once again, it is assumed that the table PART is partitioned by the column p_partkey, and that the table LINEITEM is partitioned by the column 1_orderkey. In Query 3, there are two table joins. For the known data in the tables, it can be shown that the join selectivity for "1_partkey=a.p_partkey" (the first table join) is 50%, and that the join selectivity for "1_suppkey=b.p_partkey" (the second table join) is 1%. After computing costs to shuffle the records in the table LINEITEM, it is found that mixed materialization is better for Query 3. That is, the optimal materialization scheme for Query 3 is to use early materialization in the first table join, and use late materialization in the second table join.

Figure 2:
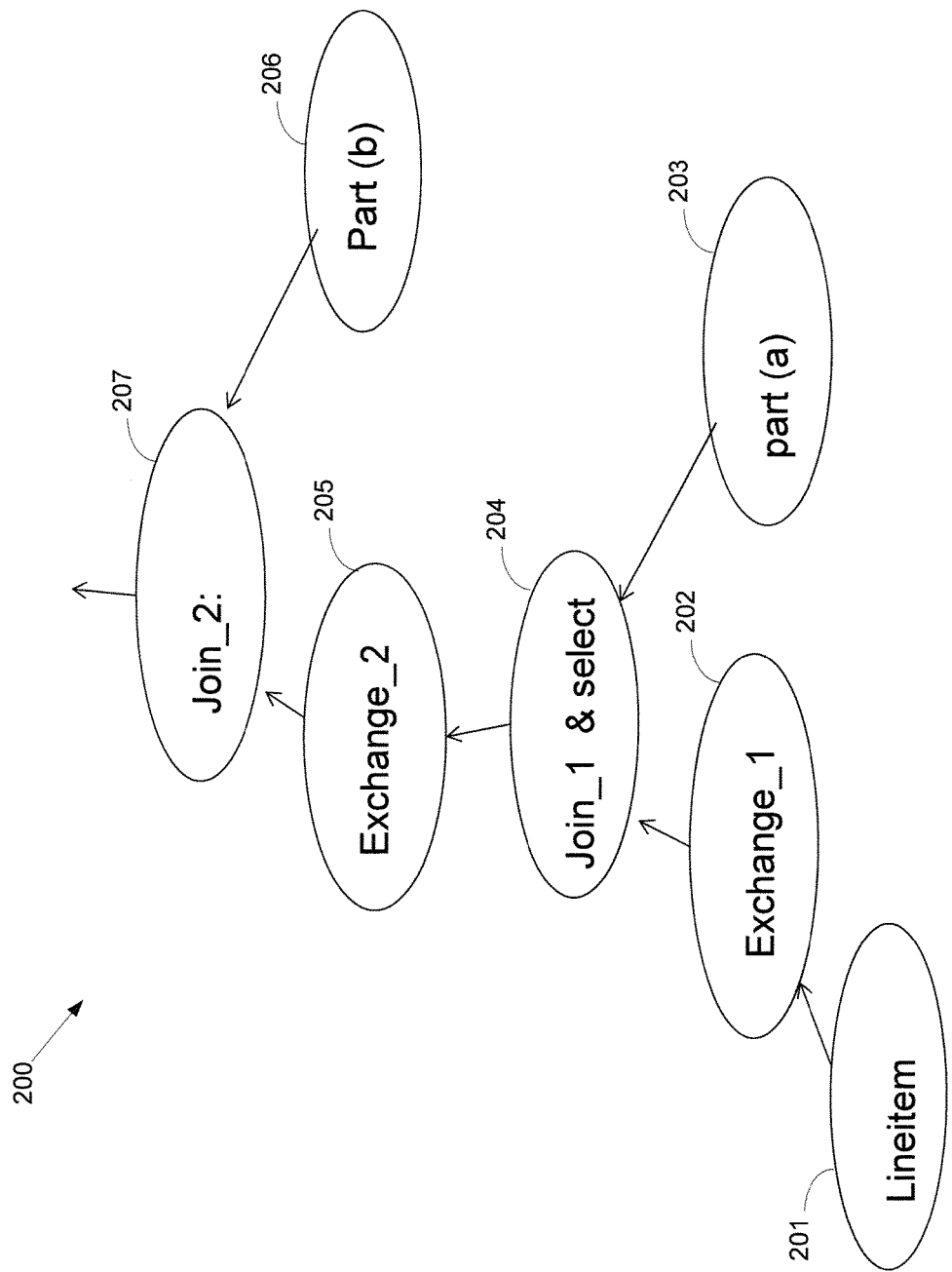
FIG. 2 illustrates a syntax tree of a query plan for a structured query language (SQL) statement.

FIG. 2 illustrates a syntax tree of a query plan for example Query 3. As shown in FIG. 2, the syntax tree 200 includes a node for each operator in Query 3. The syntax tree 200 is a directed acyclic graph (DAG) that includes a plurality of nodes 201-207. The node 201 represents the LINEITEM table in Query 3. The node 201 is at the bottom of the syntax tree 200 because LINEITEM is the first operator in Query 3. The node 202 is an exchange node that represents a data shuffling or redistribution operation in Query 3. Here, the data in the LINEITEM table is shuffled before its join to the PART table. The node 203 represents the first instance (instance A) of the PART table. The node 204 represents the join of the shuffled LINEITEM table and instance A of the PART table, as well as the SELECT statement. The node 205 is another exchange node that represents a data shuffling of the result set from the node 204. The node 206 represents the second instance (instance B) of the PART table. The node 207 represents the join of shuffled result set from the node 205 and instance B of the PART table.

Materialization Cost

In the embodiments disclosed herein, a column-specific materialization algorithm is part of a parallel query optimization compilation process that transforms a structured query language (SQL) statement into a parallel execution plan. In accordance with the disclosed embodiments, a decision to using early materialization or late materialization can be based on the following recursive reasoning.

If the parallel execution plan is represented as a DAG of exchange nodes (such as the syntax tree 200 shown in FIG. 2), the best way to materialize a column C at an exchange node E (e.g., the exchange node 205) depends on whether the column is materialized at E's child exchange node, E_1 (e.g., the exchange node 202).

For example, if column C is materialized at exchange node E_1, the cost to materialize column C at exchange node E would be the cost to materialize column C at exchange node E_1 plus the communication/CPU cost to re-shuffle column C at exchange node E. If column C is not materialized at exchange node E_1, the cost would be the cost of late materialization at exchange node E, which is the communication/CPU cost of sending Row IDs and column C's data.

Based on the preceding reasoning, the problem of computing the best materialization schedule for a column C, given the exchange node E and the parallel execution exchange node DAG, could be summarized as:

Choose the materialization schedule M so as to minimize the following cost at each level L of Exchange node E in a recursive way:

Minimize (Cost of transferring $C$'s column data based on $M[L-1]$+the cost of materializing $C$ at $E[L-1]$ according to $M[L-1]$)

where $M[L-1]$ is the materialization choice at level $L-1$, and $E[L-1]$ is the Exchange node at level $L-1$.

Turning again to FIG. 2 and Query 3, it can be shown based on the preceding reasoning, that the best way to materialize 1_suppkey at the node 202 (Exchange_1) is early materialization, while the best way to materialize 1_suppkey at the node 205 (Exchange_2) is late materialization.

In accordance with this disclosure, a method for computing the optimal materialization schedule for a column is provided. The disclosed method assumes that the distributed execution plan is represented by a DAG of exchange nodes and relational operators, such as the syntax tree 200 shown in FIG. 2. When the parent exchange node needs to materialize a column, the parent exchange node materializes this column if it has a lower cost than fetching the column from Row ID in the parent exchange node. The method can be summarized in the following outline:

1. A choice is made at each exchange node whether to materialize the column. This is based on cost comparisons.
   a. If a column is materialized at the previous exchange node:

i. If the column is materialized at the next exchange node:
  1. If the column is materialized at the current exchange node:

cost of materialization at the previous node=the transfer cost of the column from next node to current node+the cost of materialization at the next node.

2. If the column is not materialized at the current exchange node:

cost of materialization at the previous node=the cost of sending the Row ID to the source nodes+ transfer cost of the resulting column.

ii. If the column is not materialized at the next exchange node:

cost of materialization at the previous node=the cost of sending the Row ID to the source nodes+ transfer cost of the resulting column.

As a result of (a), the column is materialized at the current exchange node if it is required at the current exchange node or if the cost at (a.i.1) is smaller than cost at (a.i.2).

b. If the column is not materialized at the previous exchange node:
  i. If the column is materialized at the next exchange node:
    1. If the column is materialized at the current exchange node: cost of not materializing at the previous node=0.
    2. If the column is not materialized at the current exchange node: cost of not materializing at the previous node=0.
  ii. If the column is not materialized at the next exchange node: cost of not materializing at the previous node=0.

As a result of (b), the column is not materialized at the current exchange node.

Materialization Schedule Algorithm

FIG. 3 illustrates an example column-specific materialization algorithm 300 in accordance with this disclosure. The algorithm 300 is pseudocode of an acyclic algorithm that can represent (or be represented by) a DAG. The algorithm 300 can be part of a parallel query optimization compilation process that transforms a structured query language (SQL) statement into a parallel execution plan. In particular embodiments, the algorithm 300 can be used to perform a SQL operation that may include mixed materialization, such as Query 3. The algorithm 300 may be performed using a computing device capable of RDBMS operations, such as the computing device 700 of FIG. 7 (described below).

The algorithm 300 includes three inputs: Exchange Node E, level L, and column C. As described earlier, the exchange node is a database operator that is used to shuffle records in one or more tables. The level L is provided by the system and is used to identify a level in a query tree. Here, the levels in the query tree are numbered such that the lowest levels of the query tree are shown or indicated at the bottom of the tree, and the highest levels of the query tree are shown or indicated at the top of the tree.

Array K in the algorithm 300 contains materialization costs for the different levels. That is, each element of the array K corresponds to a materialization cost for one level. The IF-THEN-ELSE argument indicated at 301 in the algorithm 300 determines if an early schedule or a late schedule will be used for level 1 based on the materialization cost for that level. Thus, the schedule is determined first for level 1. The SET COST operation indicated at 302 is a recursive function that calls the Materialization Schedule algorithm 300 to be performed on a next lower level using Exchange Node E's child as in input. For example, if a query tree includes four levels, and the algorithm 300 is being performed for level 4, then the SET COST operation 302 is used to call the algorithm 300 to be performed for level 3. The SET SCHEDULE operation indicated at 303 is used to set the schedule (early schedule or late schedule) for levels other than level 1 by selecting the minimum cost between (a) the cost of the next lower level+the early materialization cost, and (b) the cost of the next lower level+the late materialization cost. Then, the operation indicated at 304 sets the cost at level L based on the cost of the next lower level (L−1) and the materialization cost at level L.

Dynamic Programming

The algorithm 300 is based on dynamic programming principles. Dynamic programming is a technique for solving complex problems by breaking them down into simpler sub-problems. Dynamic programming is often used in mathematics, computer science, economics, and in other fields. One classic example of a complex problem for which dynamic programming is frequently used is determining the shortest path between two cities or locations on a map, taking into account the different roads and intermediate points available in the area.

In order to be able to use dynamic programming to solve a complex problem, the complex problem itself must possess certain properties. First, the complex problem must include overlapping sub-problems. Second the complex problem must have an optimal substructure. If a problem does not possess these properties, then use of dynamic programming to solve the problem may either be impossible or lead to a sub-optimal solution.

The materialization algorithm 300 includes overlapping sub-problems. For example, the optimal schedule at level L is determined based on the optimal schedule at level L−1, while the optimal schedule at level L−1 is determined based on the optimal schedule at level L−2, and so on. Thus, the determinations of the different levels can be considered to overlap.

Similarly, the materialization algorithm 300 includes an optimal substructure. For example, the IF-THEN-ELSE argument at 301 in the algorithm 300 determines an optimal schedule for level 1 based on the materialization cost for that level, and then the algorithm 300 determines the optimal schedule for higher levels based on the schedule for the next lower level. Thus, materialization algorithm 300 includes an optimal substructure based on a lowest performance cost (i.e., a fastest execution time).

Use of dynamic programming has been shown to find a globally optimal solution for a complex problem. Dynamic programming is different from a greedy algorithm. A greedy algorithm may find a local optimal solution to a sub-problem, but often may arrive at a globally sub-optimal solution. For example, considering the shortest path between two cities problem, a greedy algorithm may find a locally optimal solution to a traffic jam at one intersection, but the local solution may be optimal for only that intersection, and may result in a sub-optimal route overall when the total route between the two cities is considered as a global solution.

As described above, the algorithm 300 can be part of a parallel query optimization compilation process that transforms a SQL statement into a parallel execution plan. One approach to this query-text to-parallel-plan transformation process to anchor the context within which the column specific algorithm 300 is performed can be summarized in the following method described in FIG. 4.

Figure 4:
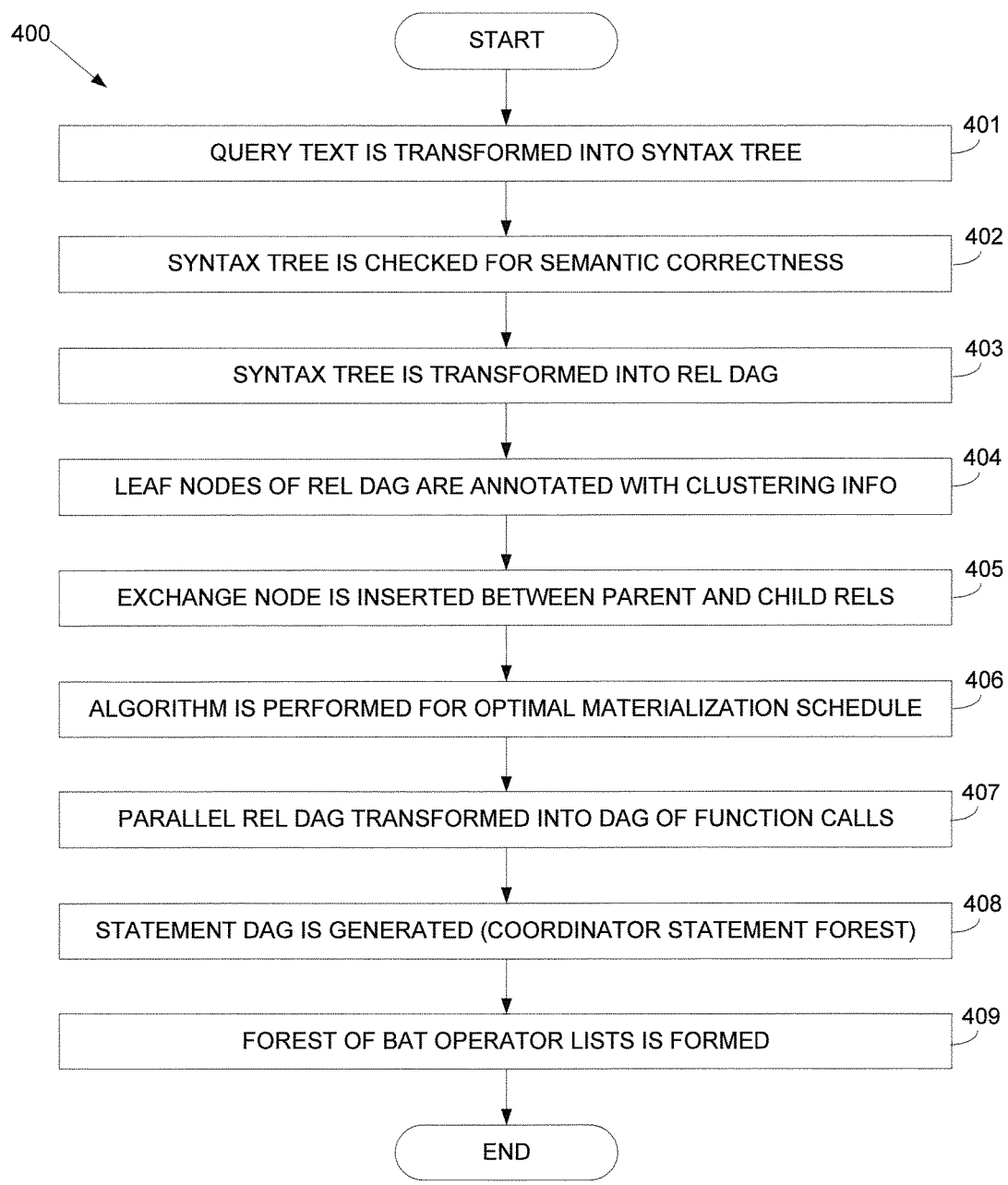
FIG. 4 illustrates an example method for parallel query optimization in accordance with this disclosure.

FIG. 4 illustrates an example method for parallel query optimization in accordance with this disclosure. For ease of explanation, the method 400 is described as being used with the algorithm 300 of FIG. 3. However, the method 400 could be used with any suitable algorithm and in any suitable system. The method 400 may be performed using a computing device capable of RDBMS operations, such as the computing device 700 of FIG. 7 (described below), or may be performed by another suitable device or system.

In operation 401, a query text is transformed into a syntax tree.

In operation 402, the syntax tree is checked for semantic correctness.

In operation 403, the syntax tree is transformed into a DAG of relational operators (rels), which may be referred to as a Rel DAG, as known in the art.

In operation 404, the leaf nodes of the Rel DAG are annotated with clustering information.

In operation 405, using a bottom-up traversal of the Rel DAG, an exchange node is inserted between a parent Rel and a child Rel when the clustering properties of the output of the child Rel is incompatible with the clustering properties of the input of the parent node. The resulting DAG is called a parallel Rel DAG. The parallel Rel DAG may be similar to the DAG 200 shown in FIG. 2.

In operation 406, a column-specific materialization algorithm (e.g., the algorithm 300) is performed to compute the optimal materialization schedule for each column.

In operation 407, the parallel Rel DAG is transformed into a DAG of function calls and data re-shuffling actions according to the following details. Each function corresponds to a fragment of the parallel Rel DAG between two adjacent exchange nodes. Each data re-shuffling action corresponds to an exchange node. Each function is transformed into a statement forest, where a statement represents a logical BAT operator. The logical BAT operator produces an expression based on expressions produced by its children statements.

To produce the expression, the logical BAT operator makes a depth-first traversal of the Rel DAG fragment. Then, for each Rel, for each expression exported by the Rel, and for each combination of the source tables' partitions, a statement DAG is generated for the expression.

Each function takes the columns' data exported from its children exchange nodes as an input. The outputs of each function are expressions exported by the top Rel of the function. The output of the function becomes the input of the data re-shuffling action of its parent exchange node. Note that Row IDs are always exported by a Rel.

Figure 5:
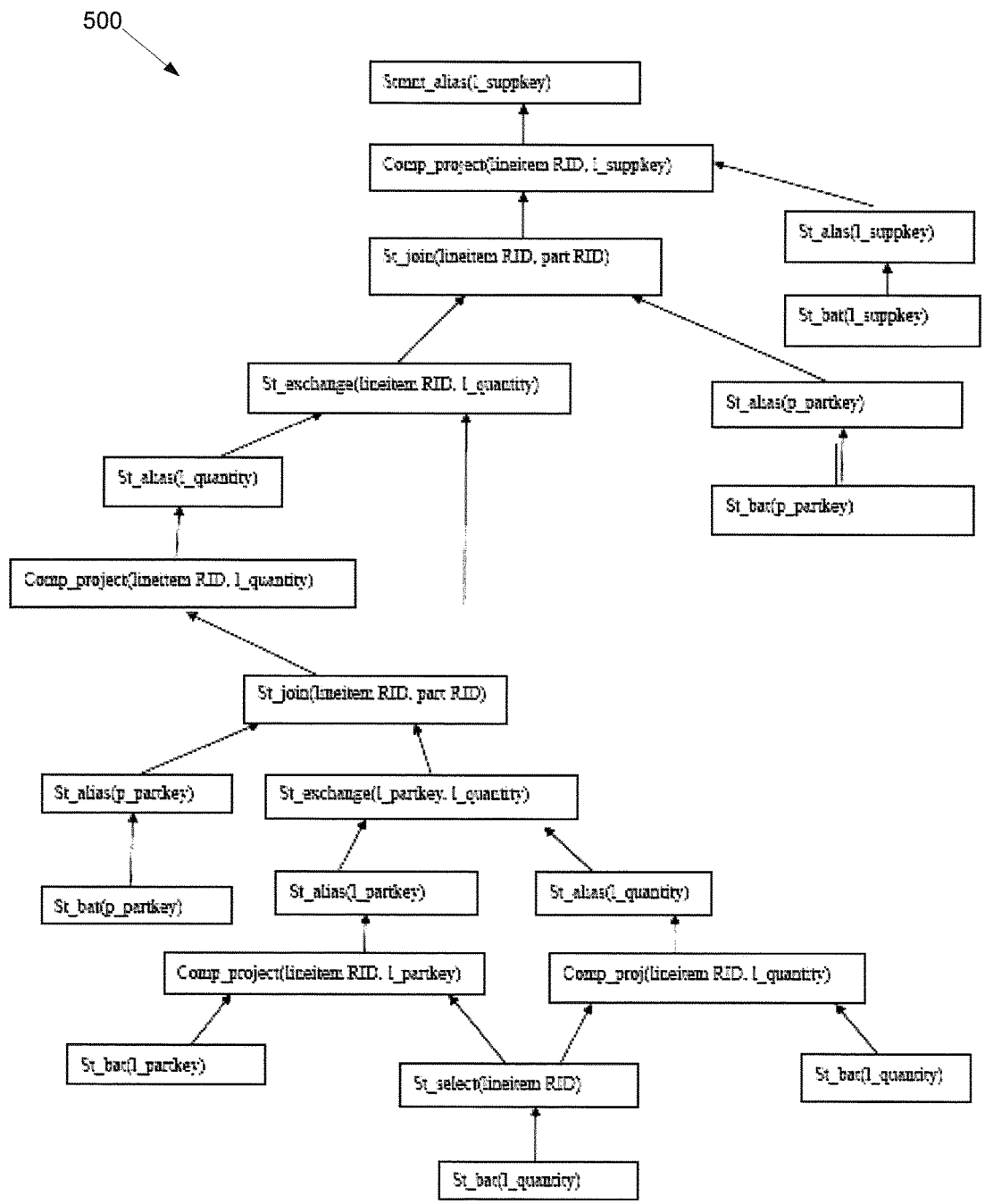
FIG. 5 illustrates an example parallel statement forest.

Each data re-shuffling action re-shuffles columns to be materialized at this exchange node. Columns to be materialized but not exported by a child exchange node are fetched by using Row IDs. Each data re-shuffling action is transformed into a statement forest containing one statement DAG for each re-shuffled column. The resulting statement forest is called the parallel statement forest. An example parallel statement forest 500 is shown in FIG. 5.

Figure 6:
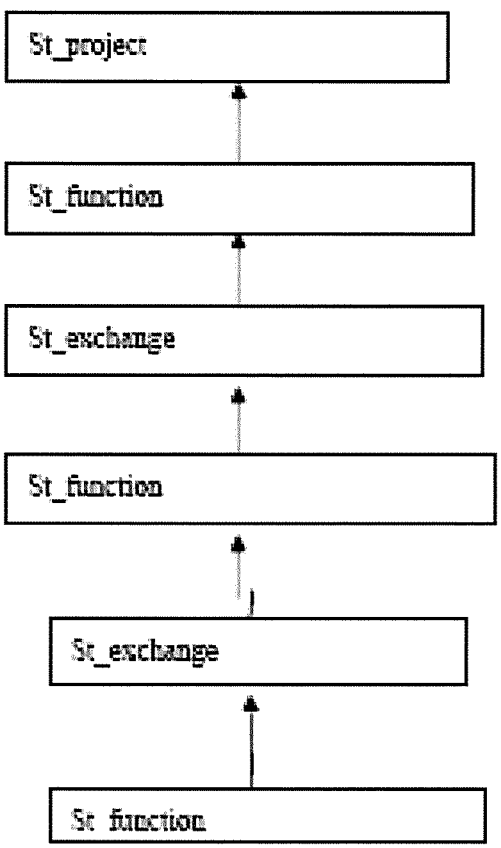
FIG. 6 illustrates an example coordinator statement forest.

Then, in operation 408, a statement DAG is generated that invokes the functions and data re-shuffling actions according to the depth-first traversal sequence of the parallel statement forest. The resulting statement DAG is called the coordinator statement forest. An example coordinator statement forest 600 is shown in FIG. 6.

In operation 409, the parallel statement forest and the coordinator statement forest are transformed into a forest of BAT operator lists. Each list corresponds to a function, a data re-shuffling action, or the coordinator program.

Although FIG. 4 illustrates one example of a method 400 for parallel query optimization, various changes may be made to FIG. 4. For example, while shown as a series of steps, various steps in FIG. 4 could overlap, occur in parallel, occur in a different order, or occur any number of times.

Figure 7:
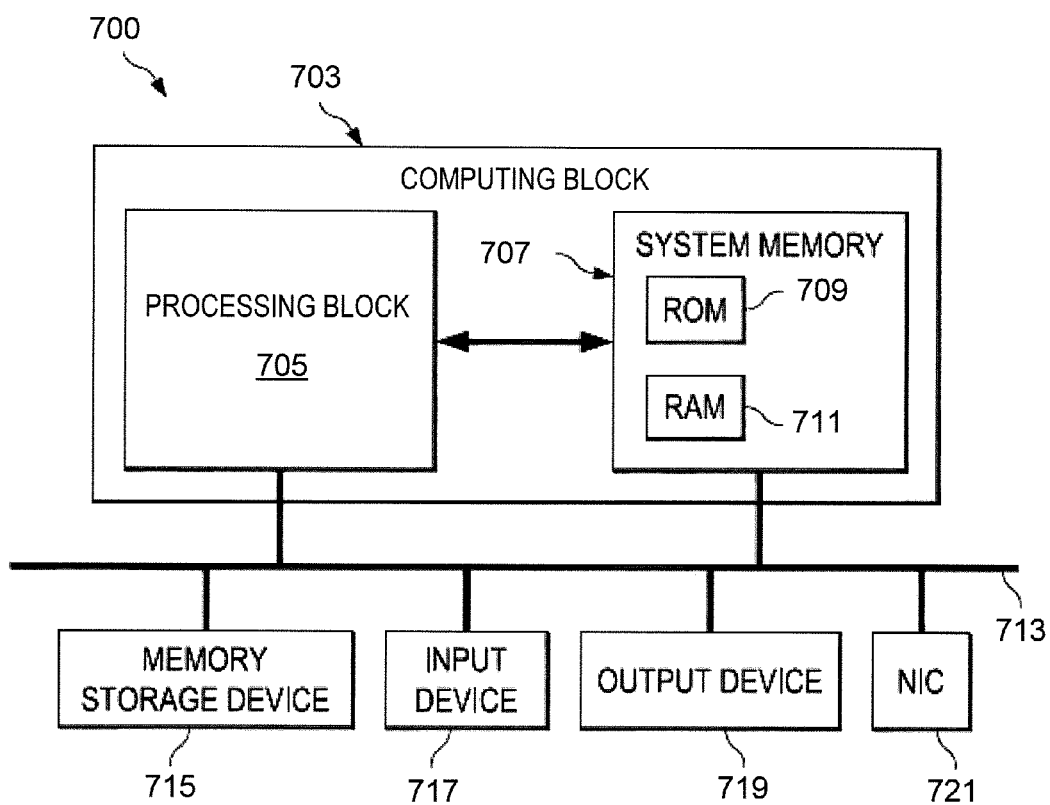
FIG. 7 illustrates an example of a computing device for parallel query optimization according to this disclosure.

FIG. 7 illustrates an example of a computing device 700 for performing the materialization algorithm 300 of FIG. 3 or the parallel query optimization method 400 of FIG. 4. As shown in FIG. 7, the computing device 700 includes a computing block 703 with a processing block 705 and a system memory 707. The processing block 705 may be any type of programmable electronic device for executing software instructions, but will conventionally be one or more microprocessors. The system memory 707 may include both a read-only memory (ROM) 709 and a random access memory (RAM) 711. As will be appreciated by those of skill in the art, both the read-only memory 709 and the random access memory 711 may store software instructions for execution by the processing block 705.

The processing block 705 and the system memory 707 are connected, either directly or indirectly, through a bus 713 or alternate communication structure, to one or more peripheral devices. For example, the processing block 705 or the system memory 707 may be directly or indirectly connected to one or more additional memory storage devices 715. The memory storage devices 715 may include, for example, a "hard" magnetic disk drive, a solid state disk drive, an optical disk drive, and a removable disk drive. The processing block 705 and the system memory 707 also may be directly or indirectly connected to one or more input devices 717 and one or more output devices 719. The input devices 717 may include, for example, a keyboard, a pointing device (such as a mouse, touchpad, stylus, trackball, or joystick), a touch screen, a scanner, a camera, and a microphone. The output devices 719 may include, for example, a display device, a printer and speakers. Such a display device may be configured to display video images. With various examples of the computing device 700, one or more of the peripheral devices 715-719 may be internally housed with the computing block 703. Alternately, one or more of the peripheral devices 715-719 may be external to the housing for the computing block 703 and connected to the bus 713 through, for example, a Universal Serial Bus (USB) connection or a digital visual interface (DVI) connection.

With some implementations, the computing block 703 may also be directly or indirectly connected to one or more network interfaces cards (NIC) 721, for communicating with other devices making up a network. The network interface cards 721 translate data and control signals from the computing block 703 into network messages according to one or more communication protocols, such as the transmission control protocol (TCP) and the Internet protocol (IP). Also, the network interface cards 721 may employ any suitable connection agent (or combination of agents) for connecting to a network, including, for example, a wireless transceiver, a modem, or an Ethernet connection.

It should be appreciated that the computing device 700 is illustrated as an example only, and it not intended to be limiting. Various embodiments of this disclosure may be implemented using one or more computing devices that include the components of the computing device 700 illustrated in FIG. 7, or which include an alternate combination of components, including components that are not shown in FIG. 7. For example, various embodiments of the invention may be implemented using a multi-processor computer, a plurality of single and/or multiprocessor computers arranged into a network, or some combination of both.

The algorithm described in this disclosure computes the best materialization schedule for each column on every exchange operator within a query. This is advantageous over existing materialization scheduling algorithms that employ either fixed early materialization or fixed late materialization for all exchange operators in a query. The algorithm disclosed herein can be implemented by traversing the parallel execution graph from the top down, identifying columns that have not been scheduled. For each such column, dynamic programming is applied to compute the materialization schedule in a recursive (or bottom up) fashion. The minimum materialization costs at level L−1 do not change with the choice of materialization at levels greater or equal to L. The computation complexity is linearly proportional to the height of the parallel execution graph and number of columns.

Embodiments of this disclosure has been demonstrated in simulation tests to reduce the interconnect bandwidth requirement for distributed query processing by an average of 10%-30%. Assuming that the inter-node communication cost is about 25% of the total query processing cost, this reduces the total cost of distributed query processing by 2.5%-7.5%.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of establishing a materialization schedule using a dynamic programming technique configured to be executed on a processor of a computing device in a relational data base management system (RDBMS), the method comprising:
receiving, by the processor, a query text;
transforming, by the processor, the query text into a relational operator (Rel) directed acyclic graph (DAG);
performing, by the processor, a bottom-up traversal of the Rel DAG to create a parallel Rel DAG;
computing, by the processor, a column specific materialization schedule of the parallel Rel DAG;
transforming, by the processor, the parallel Rel DAG into a DAG of function calls and data re-shuffling actions to create a parallel statement forest, wherein:
each function call takes data of columns exported from child Rel nodes of the function call as an input,
each function call has, as an output, expressions exported by a top Rel of the function call, and
the output of each function call is an input of the data re-shuffling action of a parent exchange node of the function call, wherein Row IDs are exported by a Rel;
generating, by the processor, a coordinator statement forest that invokes the function calls and the data re-shuffling actions according to the parallel statement forest;
transforming, by the processor, the parallel statement forest and the coordinator statement forest into a forest of binary association table (BAT) operator lists to compute an optimal materialization schedule for each column of a table; and
materializing the columns according to the optimal materialization schedule.

2. The method as specified in claim 1, wherein:
each function call corresponds to a fragment of the parallel Rel DAG between two adjacent exchange nodes; and
each data re-shuffling action corresponds to an exchange node.

3. The method as specified in claim 2, wherein leaf nodes of the Rel DAG are annotated with clustering information.

4. The method as specified in claim 3, wherein the bottom-up traversal is performed by inserting, by the processor, an exchange node between a parent Rel node and a child Rel node when a clustering property of an output of the child Rel node is incompatible with a clustering property of an input of the parent Rel node.

5. The method as specified in claim 4, wherein each function call is transformed into a statement forest, wherein a statement represents a BAT operator, to produce an expression produced by a child statement of the function call.

6. The method as specified in claim 5, wherein the expression is produced by:
performing, by the processor, a depth-first traversal of the corresponding Rel DAG fragment, and
for each Rel, for each expression exported by the Rel, and for each combination of partitions of a source partitions, generating, by the processor, a statement DAG for the expression.

7. The method as specified in claim 4, wherein each data re-shuffling action re-shuffles columns to be materialized at a respective Rel node, and columns materialized but not exported by a child Rel node are fetched by using Row IDs.

8. The method as specified in claim 7, wherein each data re-shuffling action is transformed into a statement forest containing one statement DAG for each re-shuffled column to create the parallel statement forest.

9. The method as specified in claim 8, further comprising generating, by the processor, a statement DAG that invokes the function calls and data re-shuffling actions according to a depth-first traversal sequence of the parallel statement forest to create the coordinator statement forest.

10. A relational data base management system (RDBMS) including software that configures a processor of a computing device to:
receive a query text;

transform the query text into a relational operator (Rel) directed acyclic graph (DAG);

perform a bottom-up traversal of the Rel DAG to create a parallel Rel DAG;

compute a column specific materialization schedule of the parallel Rel DAG;

transform the parallel Rel DAG into a DAG of function calls and data re-shuffling actions to create a parallel statement forest, wherein:
- each function call takes data of columns exported from child Rel nodes of the function call as an input,
- each function call has, as an output, expressions exported by a top Rel of the function call, and
- the output of the function call is an input of the data re-shuffling action of a parent exchange node of the function call, wherein Row IDs are exported by a Rel;

generate a coordinator statement forest that invokes the function calls and the data re-shuffling actions according to the parallel statement forest;

transform the parallel statement forest and the coordinator statement forest into a forest of binary association table (BAT) operator lists to compute an optimal materialization schedule for each column of a table; and materialize the columns according to the optimal materialization schedule.

11. The RDBMS as specified in claim 10, wherein:
each function call corresponds to a fragment of the parallel Rel DAG between two adjacent exchange nodes; and
each data re-shuffling action corresponds to an exchange node.

12. The RDBMS as specified in claim 11, wherein leaf nodes of the Rel DAG are annotated with clustering information.

13. The RDBMS as specified in claim 12, wherein the software further configures the processor to perform the bottom-up traversal by inserting an exchange node between a parent Rel node and a child Rel node when a clustering property of an output of the child Rel node is incompatible with a clustering property of an input of the parent Rel node.

14. The RDBMS as specified in claim 13, wherein the software configures the processor to transform each function call into a statement forest, wherein a statement represents a BAT operator, to produce an expression produced by a child statement of the function call.

15. The RDBMS as specified in claim 14, wherein the software configures the processor to produce the expression by:
performing a depth-first traversal of the corresponding Rel DAG fragment, and
for each Rel, for each expression exported by the Rel, and for each combination of a source tables' partitions, generating a statement DAG for the expression.

16. The RDBMS as specified in claim 13, wherein each data re-shuffling action re-shuffles columns to be materialized at a respective Rel node, and the software configures the processor to fetch columns materialized but not exported by a child Rel node using Row IDs.

17. The RDBMS as specified in claim 16, wherein the software configures the processor to transform each data re-shuffling action into a statement forest containing one statement DAG for each re-shuffled column to create the parallel statement forest.

18. A method of establishing a materialization schedule using a dynamic programming technique configured to be executed on a processor of a computing device in a relational database management system (RDBMS), the method comprising:
receiving, by the processor, a query text;
transforming, by the processor, the query text into a relational operator (Rel) directed acyclic graph (DAG);
performing, by the processor, a bottom-up traversal of the Rel DAG to create a parallel Rel DAG;
computing, by the processor, a column specific materialization schedule of the parallel Rel DAG;
transforming, by the processor, the parallel Rel DAG into a DAG of function calls and data re-shuffling actions to create a parallel statement forest, wherein:
- each function call takes data of columns exported from child Rel nodes of the function as an input,
- each function call has, as an output, expressions exported by a top Rel of the function call, and
- the output of the function call is the input of the data re-shuffling action of a parent exchange node of the function call, wherein Row IDs are exported by a Rel;

generating a coordinator statement forest that invokes the function calls and the data re-shuffling actions according to the parallel statement forest;

transforming the parallel statement forest and the coordinator statement forest into a forest of binary association table (BAT) operator lists to compute an optimal materialization schedule for each column of a table; and materializing the columns according to the optimal materialization schedule.

* * * * *